Dec. 13, 1949     H. J. WOOD     2,491,461
PRESSURIZATION SYSTEM FOR AIRCRAFT
Filed Dec. 29, 1945     3 Sheets-Sheet 1

INVENTOR.
HOMER J. WOOD
BY
ATTORNEY

Dec. 13, 1949     H. J. WOOD     2,491,461
PRESSURIZATION SYSTEM FOR AIRCRAFT
Filed Dec. 29, 1945     3 Sheets-Sheet 2

INVENTOR.
HOMER J. WOOD
BY
ATTORNEY

Dec. 13, 1949 H. J. WOOD 2,491,461
PRESSURIZATION SYSTEM FOR AIRCRAFT
Filed Dec. 29, 1945 3 Sheets-Sheet 3
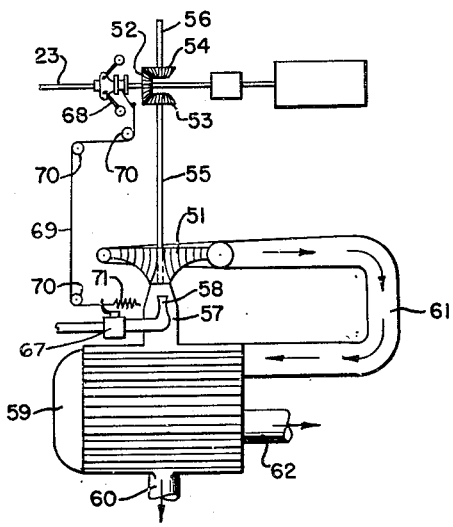
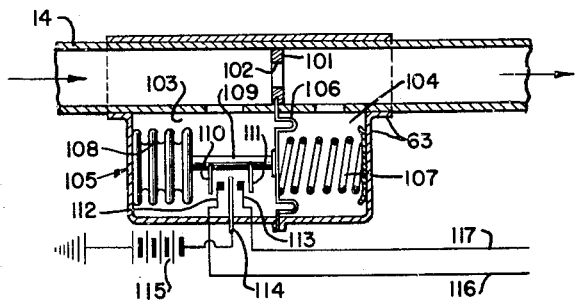
INVENTOR.
HOMER J. WOOD
BY
ATTORNEY Patented Dec. 13, 1949

2,491,461

UNITED STATES PATENT OFFICE 2,491,461

PRESSURIZATION SYSTEM FOR AIRCRAFT

Homer J. Wood, Los Angeles, Calif., assignor to The Garrett Corporation, Los Angeles, Calif., a corporation of California Application December 29, 1945, Serial No. 638,276

20 Claims. (Cl. 257—3)

This invention relates to the circulation of gases under pressure through an enclosure, and is particularly useful in connection with the circulation of air under pressure through an aircraft cabin. A general object of the invention is to provide a method and apparatus for circulating a predetermined flow of air through a cabin while controlling the pressure thereof.

Another object of the invention is to provide a method and system for circulating air in a manner to conserve energy. To this end, the invention contemplates a system in which a part of the cabin air is recirculated. Thus, the invention reduces the load on the air compressing mechanism and also reduces the dissipation of heat in air exhausted from the cabin.

A further object of the invention in a system of the type indicated above is an automatic control mechanism for controlling the cabin pressure by controlling substantially the entire circulating apparatus.

Another object is to provide a system in which this control is responsive to cabin pressure requirements.

Another object of the invention is to provide an air circulating system in which the requirement for heating the cabin air is met, insofar as possible, by utilizing the heat of compression developed in the compressing apparatus, and wherein supplemental heating apparatus is employed only when additional heat is required.

Another important object of the invention is to provide a cabin ventilating system wherein pressurization is maintained in such a manner as to add to the volume of air in the cabin only that amount which is required to replace that which is allowed to escape to ambient atmosphere through cabin leakage.

The compression of the air which is being delivered into the cabin adds heat to the air. The invention aims to utilize such heat for satisfying the heating requirements so far as possible. When the plane is operating in an extremely cold atmosphere however, additional heat may be required, and the invention therefore contemplates the provision of a suitable heater for supplemental heating of the air being delivered into the cabin.

Power is required for operating the supercharger or superchargers which compress the air when operating conditions require the air to be delivered into the cabin under pressure. The most practicable means for driving such supercharging equipment is a combustion motor of some kind. The exhaust from such combustion motor ordinarily carries away a considerable amount of waste energy in the form of heat. An important object of the invention is to utilize this waste energy as far as possible, and, accordingly, the invention contemplates the passing of the exhaust from the combustion engine, which drives the superchargers through the heat exchanger which provides supplemental heat. A further object of the invention is to provide a method and means for controlling such utilization of waste heat, and consequently the invention provides for the routing of the heated gases which are discharged from the combustion engine, either to atmosphere or to the supplemental cabin air heater, or partially to both, in accordance with heating requirements.

As a means for further utilizing the exhaust gases from the combustion engine, the invention provides for passing such gases through a heat exchanger which utilizes a portion of the heat of said gases to heat the air delivered to the combustion engine in order to provide a more efficient combustion of fuel.

Under warm weather operating conditions the heat imparted to the air by compression in the supercharging apparatus may raise the temperature of the air in the cabin to an uncomfortably high level, and in order to counteract this condition and to maintain the cabin temperature at an appropriate level, the invention has as another of its objects means for cooling the air being delivered to the cabin whenever required. A further object is to provide for cooling the air in such a manner as to avoid the expenditure of additional energy for such cooling. On the contrary, the invention aims to utilize the heat energy abstracted from the air in the cooling process to perform useful work in operating the apparatus, and to this end the invention contemplates passing the air, on its way to the cabin, through a turbine which cools the air by abstracting energy therefrom and delivering such energy to the supercharger drive mechanism.

A further object of the invention is to provide cooling apparatus capable of reducing the cabin temperature below ambient atmospheric temperature, and consequently the invention provides for passing the compressed air, on its way to the cooling turbine, through a heat exchanger in which heat is abstracted from the compressed air by atmospheric air passed therethrough. Such atmospheric air may be driven through the heat exchanger by receiving the same in a ram inlet which is operative whenever the plane is in flight, and the invention contemplates employment of supplemental, power driven, air circulating means for driving the air through this heat exchanger when the plane is grounded.

A further object of the invention is to avoid whenever possible, unnecessary complexity in the apparatus, and to this end the invention contemplates the employment of the same heat exchanger for cooling the compressed air on its way to the cooling turbine when cooling is required and for heating said air when heating is required. In the furtherance of this object the discharge from the air preheater is, when heating is required, carried to the cabin air heat exchanger through a conduit which joins the duct leading to this heat exchanger from the ram inlet.

A further object of the invention is to provide for the correlated control of the heating and cooling functions by a single control responsive to changes in cabin temperature, and this object is carried out by providing shutter means for closing off the ram inlet and a valve for directing the flow of exhaust combustion gases either to atmosphere or to the cabin air heat exchanger inlet duct, the correlation being such that as the ram inlet is gradually closed off, the exhaust combustion gases will be increasingly diverted to the cabin air heat exchanger and as the ram inlet is increasingly opened, the exhaust combustion gases will be increasingly diverted to atmosphere.

A further object is to provide a system in which the flow of air through the cabin will be maintained as nearly as possible at a constant value corresponding to ventilation requirements, and wherein the control mechanism includes means sensitive to changes in this flow and operative to restore the flow in response to such changes.

A further object is to provide a system wherein recirculation is coordinated with the input of fresh air in such a manner as to cooperate in maintaining the desired flow. The invention utilizes a primary stage compressor for adding fresh air to the system and a second stage compressor receives the recirculatory outflow from the cabin and also the output of the primary compressor and circulates the combined flow through the temperature conditioning apparatus and the cabin. The speed of the second stage compressor and of the cooling turbine is controlled in accordance with the power requirements of the primary compressor and the rate of fuel supply to the combustion engine, which in turn is under the control of a flow meter so that whenever the air flow departs from a predetermined value the fuel supply is varied in such a manner as to return the air flow to the prescribed value. This is accomplished by controlling the fueling of the combustion engine in inverse proportion to the rate of flow of the circulating air through the flow meter.

Further objects and advantages of the invention will be brought out in the following part of the specification.

Referring to the drawings which are for illustrative purposes only,

Fig. 3 is a schematic showing of a modified form of control mechanism for the combustion engine; and Fig. 4 is a detailed schematic view of the flow meter.

Figure 1:
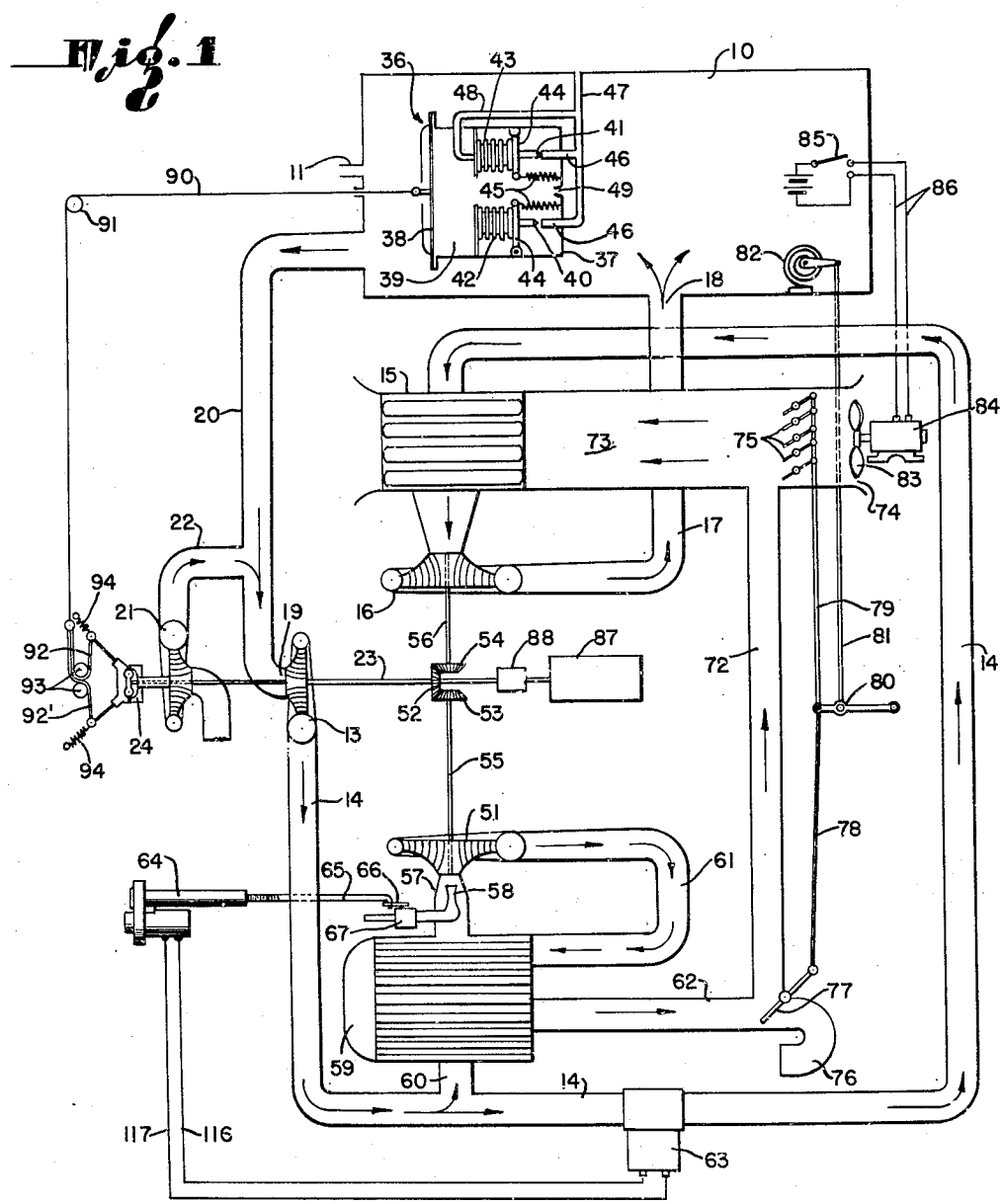
Fig. 1 is a schematic showing of a system for circulating air through an airplane cabin under pressure and temperature control.
Figure 2:
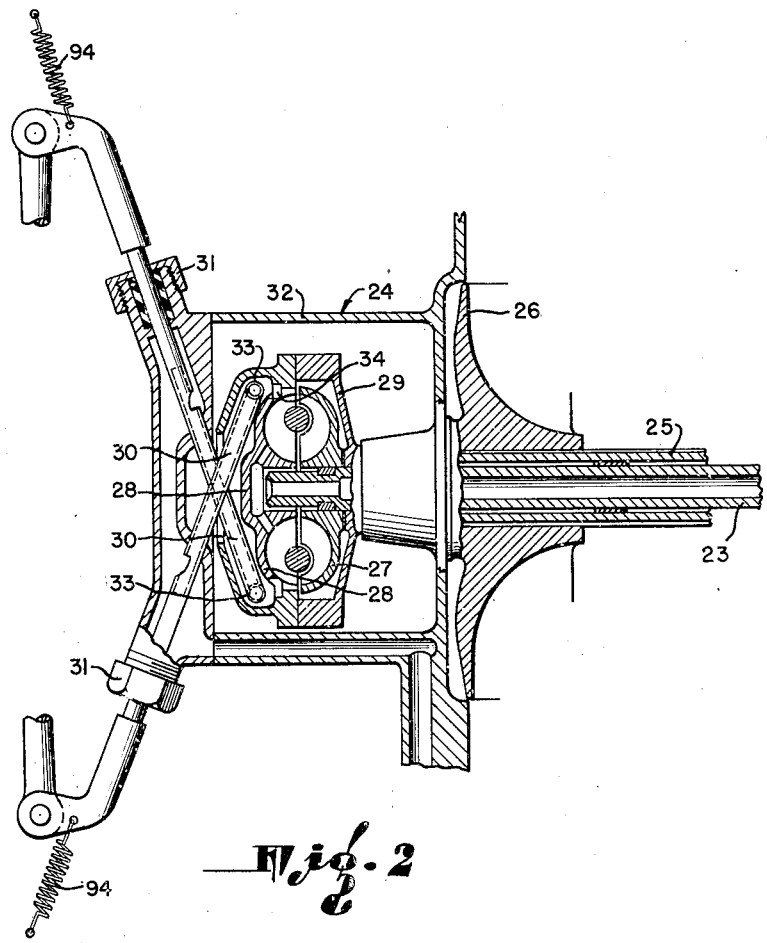
Fig. 2 is a detail sectional view of a variable drive which may be employed for controlling the speed of the primary compressor.

As an example of one form in which the invention may be embodied, I have shown in the drawings an airplane cabin flow regulation, pressurization and temperature control system in which the cabin is indicated schematically at 10, and in which there will be an escape of air through small cracks, etc., which will unavoidably occur in the wall structure of such cabin. Such leakage outflow is indicated at 11.

Air delivered under pressure from a second stage compressor 13 is forced through a conduit 14, an air conditioning heat exchanger 15, a cooling turbine 16, and a conduit 17 to the cabin inlet 18. The volume of air delivered from the compressor 13 is determined by its speed of rotation. The inlet 19 receives recirculated air from the cabin through a conduit 20, and fresh air from a primary compressor 21, delivered through a conduit 22. The conduit 22 joins the conduit 20 and mixes the fresh air with the recirculated air in the conduit 20.

The pressure of the air in the cabin 10 is determined, in accordance with cabin pressure requirements, by the speed of the primary compressor 21, which speed may be varied by varying the drive to the primary compressor 21 from the drive shaft 23 through a variable slip fluid coupling 24 or equivalent clutch device. The rotor of the second stage compressor 13 is fixedly mounted on the shaft 23 and rotates therewith at all times, while the shaft 23 passes freely through a shaft 25 on which the rotor 26 of the primary compressor 21 is mounted, and is drivingly connected to the impeller 27 of the fluid coupling 24, the sleeve 25 in turn being driven by the runner 28 of the fluid coupling 24 through the casing 29 thereof.

The fluid coupling 24, which is shown merely as an example of one type of variable drive connection which may be employed for variably driving the primary compressor 21 from the more constant rate shaft 23, is shown as being of a known variable slip type wherein the speed of the runner relative to the impeller speed may be varied by means of a pair of scoop tubes 30 slidably mounted in glands 31 in the outer housing 32 of the fluid coupling, and having scooped ends 33 adapted to abstract a variable quantity of fluid from the rotatable housing 29 and thereby vary the amount which may pass through the opening 34 of the runner into the working space between the runner and the impeller 27, thus varying the drive between the impeller and the runner.

The speed of the primary compressor 21 is controlled in accordance with cabin pressure requirements by controlling the position of the scoop tubes 30. Merely as illustrative of the mechanism which can be utilized for this purpose, we have shown within the cabin 10 a pressure sensitive control unit which is indicated generally at 36. This unit comprises a casing member 37 and a diaphragm 38 cooperating therewith to define a control chamber 39 wherein a pressure corresponding to cabin pressure requirements is maintained. This diaphragm is connected by a fitting at its center to the scoop tubes 30 of fluid coupling 24 by means of cable 90. Springs 94 establish a predetermined tension in cable 90 such that, under normal operating conditions, diaphragm 38 is maintained in a neutral position by means of the cabin pressure acting on one side and the control chamber pressure and the spring tension acting on the other side.

The control chamber 39 contains two pneumatic control systems: the isobaric and the differential. The former comprises an evacuated isobaric bellows 42, lever arm 44, metering valve 40 and valve seat 46. The latter comprises a differential bellows 43, lever arm 44, metering valve 41 and valve seat 46. The valve seats 46—46 are vented to atmosphere through a tube 47. The interior of differential bellows 43 is also vented to atmosphere through a tube 48. Tension springs 45, which are anchored respectively at one end to a wall of casing member 37 and to a lever arm 44 at the other end, serve to urge metering valves 40 and 41 to a closed condition. An orifice 49 is provided in the wall of casing member 37 which allows cabin air to bleed into the control chamber 39. Orifice 49 is purposely made smaller than valve seats 46 and tube 47 so as to maintain a pressure drop between the cabin and the control chamber during operation periods.

This control unit 36, as shown and described above, is one type of pressure sensitive control which may be used in conjunction with our invention, particularly where it is desired to control cabin pressure in several stages within corresponding altitude ranges. It is adapted to permit cabin pressure to remain substantially at atmospheric values from sea level up to a predetermined altitude, such as 10,000 feet; to then maintain a substantially constant cabin pressure between that altitude and a second predetermined and higher altitude, say 30,000 feet; and thereafter to maintain cabin pressure at a substantially fixed differential pressure relative to ambient pressures, say 7 inches of mercury. These stages may be identified as unpressurized, isobaric, and differential, respectively, and the mode of operation of this pressure sensitive control will now be described under these headings.

With the airplane at rest at sea level, the pressures in the cabin and the control chamber 39 are equal. Diaphragm 38 is moved slightly outward under the tension of springs 94 transmitted through short cable elements 92 and 92' and cable 90, pulleys 93 and 91 being provided for anti-friction purposes. Scoop tubes 30 are at this time in their outward position and the fluid coupling 24 is thus adjusted to give maximum coupling between the primary compressor 21 and shaft 23. The isobaric bellows 42 is fully compressed and metering valve 40 is open. The differential bellows 43 is fully extended and metering valve 41 is fully closed.

The apparatus is now put in motion by means of starter motor 87. As soon as initial compression is accomplished by the compressors and a flow of air is established, combustion turbine 51 is started up, and quickly brings the system up to its normal prescribed operating speed. Primary compressor 21, at this point, will be operating at maximum speed to supply the necessary air to bring the system under the small degree of pressurization which is inherently maintained in any such closed cycle installation. As this small head of pressure is built up within cabin 10, a pressure drop builds up across orifice 49. Due to the atmospheric vent tubes being of larger diameter than orifice 49, the pressure in control chamber 39 remains at atmospheric value, hence diaphragm 38 moves inwardly to its neutral position which, in turn, by pulling scoop tubes 30 inwardly, slows down the primary compressor 21 to its normal speed which is that sufficient to maintain the desired pressure in cabin 10 and supply additional air to make up for that lost through the combustion turbine 51 and cabin leakage.

As the airplane takes off and ascends, all pressures drop as a function of increasing altitude and decreasing atmospheric pressure. The system barring any unusual disturbance, remains at normal. The isobaric bellows 42 extends slowly under the diminishing pressures of the cabin and the control chamber, but metering valve 40 remains wide open. Any changes in cabin pressure, which may occur, naturally result in a movement of diaphragm 38, which as pointed out heretofore, further results in a change in speed and output pressure of the primary compressor 21.

As the airplane passes into the isobaric range, the pressure in control chamber 39 diminishes to the point where the tension spring 45 begins to take charge and metering valve 40 is slowly moved toward the closed position. This action of bellows 42 and its associated tension spring 45 prevents further decrease in control chamber pressure and maintains the chamber at a selected constant pressure throughout the isobaric phase of operation. Since control chamber pressure is held at a constant value, any decrease in cabin pressure as the airplane ascends causes diaphragm 38 to move outwardly which, in turn, speeds up primary compressor 21 thus raising cabin pressure to its selected value, which latter value is, of course, a designed function of that selected for and built into the pressure sensitive control 36.

As the airplane continues to ascend, the differential pressure between the cabin and atmosphere approaches the maximum designed value which is a function of the structural limitations of the airplane, say 7 inches of mercury. When this point is reached, the isobaric bellows 42 becomes fully expanded, metering valve 40 closes completely, and control is taken over by differential bellows 43 because the pressure differential between control chamber pressure and atmospheric is sufficient to compress the differential bellows against the opposing force of the tension spring and begin moving the metering valve 41 off its seat. This allows air to escape from the control chamber to atmosphere through the vent tube. As the control chamber pressure decreases, diaphragm 38 moves inwardly and thus slows primary compressor 21 which in turn reduces the cabin pressure. This action continues throughout the differential phase of operation to maintain cabin pressure at the selected ratio to atmosphere.

The outflow from the cabin through the conduit 20 must take place against the pressure head developed by the primary compressor 21, and cabin pressure will correspond to this pressure head which in turn will depend upon the speed at which the primary compressor 21 is driven. Subject to a slight pressure drop between the cabin and the conduit 22, cabin pressure will be substantially determined by the pressure in the conduit 22. Correspondingly, a fairly constant ratio will be maintained between this cabin outlet pressure and the higher pressure in the conduit 14 developed in the secondary compressor 13, since the output of the compressor 13 will be directly related to the input.

The compressor shaft 23 is driven primarily from the combustion engine 51 (shown as comprising a gas turbine) and secondarily from the output of the cooling turbine 16, being geared to the two turbines by a bevel gear 52 on the shaft 23 and bevel gears 53 and 54 on the shafts 55 and 56 which are driven respectively by the turbines 51 and 16. The turbine 51 is powered by combustion in a combustion chamber 57 into which fuel is injected by a burner nozzle 58 and is mixed with air delivered through a heat exchanger 59 and a conduit 60 branching from the conduit 14. The heat exchanger 59 derives heat from the exhaust gases from the turbine 51 which are passed into the heat exchanger through a conduit 61 and are delivered from the heat exchanger through a conduit 62.

It is a characteristic of this system that, with a normally prescribed speed of the compressors and the turbines 16 and 15, the air flow through the conduit 14 to the cabin will be at a nearly constant volume rate. When a deviation in cabin pressure occurs, movement of the diaphragm 38 will readjust coupling 24 so that there will be a resultant change in the speed of primary compressor 21, as previously described. This change in speed of the primary compressor results in a change of load on shaft 23 which acts directly on the combustion turbine 51 and thereby changes its speed. Due to the rigid connections between them, this change in speed of the prime mover is reflected back into the secondary compressor and the cooling turbine 16. As the speed of the secondary compressor is changed, the quantity of air flow through the flow meter 63 varies which in turn causes the controlled fuel supply to the burner 58 to vary inversely with the quantity of air flow. Consequently, whenever such air flow departs from the designed value, the fuel regulating means will respond and restore the speed of the combustion turbine, cooling turbine and secondary compressor to that normally prescribed, thus returning the flow of air to the cabin to its normal, selected value.

Referring now to Fig. 4, the flow meter 63 includes a baffle 101 in the conduit 14, having a restricted orifice 102, across which a pressure drop will occur. This pressure drop is reflected in the chambers 103 and 104 of a casing 105, the chambers 103 and 104 being divided by a diaphragm 106. A spring 107, secured at its respective ends to the diaphragm 106 and the end of the casing 105, exerts a pull on the diaphragm which is balanced by the pull of an evacuated bellows 108, connected to the diaphragm by a shaft 109. The shaft 109 carries a pair of actuating fingers 110, 111 which are adapted to respectively move contacts 112, 113 into engagement with a contact 114 which is connected to a source of current 115. Conductors 116, 117 connect the contacts 112, 113 to the respective circuits of a reversible electric motor driven screw jack 64. The screw jack 64 operates a rod 65, which is connected to a control lever 66 of a fuel valve 67.

Whenever the flow in the conduit 14 varies from the prescribed value, the change in pressure drop across the orifice 102 will cause the diaphragm 106 to move (in the direction to close the circuit 116 when the pressure increases and in a direction to close the circuit 117 when the pressure drop decreases).

When the pressure drop increases (corresponding to an increase in flow above the normal) the valve 67 will be actuated to throttle down the supply of fuel to the nozzle 58, thereby slowing down the shafts 55 and 23. When the pressure drop decreases (in response to decrease in flow below the normal), the fuel valve 67 will be actuated to increase the supply of fuel to the burner 28, thereby speeding up the turbine 51 and shafts 55 and 23. These changes will slow down or speed up, as the case may be, the operation of the entire circulating system, by restoring the flow to the prescribed level.

As an alternative means for controlling the fuel supply, I have shown in Fig. 3 an arrangement wherein a centrifugal governor 68, driven by the shaft 23, controls the valve 67 through a suitable connection such as the cable 69 passing around pulleys 70, and a spring 71 acting in opposition to the pull of the cable 69.

The expansion of the combustion gases from the combustion chamber 57 through the turbine 51 provides a major portion of the power for operating the system. The spent gases leaving the turbine 51 are passed through the heat exchanger 59 for the purpose of reducing fuel input requirements, and are then utilized, when necessary, for heating the air entering the cabin 10.

The cabin heating is accomplished by diverting all or a portion of the waste combustion gases through the conduit 72 to an inlet duct 73 leading to the cabin air conditioning heat exchanger 15. The inlet end of the duct 73 may comprise a ram inlet 74 arranged to scoop up air during the flight of the plane. The flow of air through the ram inlet 74 is controlled by shutters 75. The combustion gases passing through the conduit 62 either pass out through a discharge outlet 76 on the end of the conduit 62, directly to atmosphere, or through the conduit 72 to the inlet duct 73 or a portion through each, depending upon the position of a valve 77 at the junction between the conduits 72 and 62. The valve 77 and shutters 75 are connected for movement in unison, such that the shutters 75 are moved toward open position as the valve 77 moves toward the position for shutting off the conduit 72 and diverting the flow from the conduit 62 to the outlet 76. The connection between the valve 77 and shutters 75 may comprise links 78 and 79 joined by a suitable movement transmitting mechanism such as the lever 80 and rod 81, the latter operated by a thermo-responsive device such as the bi-metallic coil 82. Thus the valve 77 and shutters 75 are movable in unison in response to changes in cabin temperature so as to vary the flow of heated gases from the heat exchanger 59 to the heat exchanger 15 in accordance with heating or cooling requirements.

The passage of air through the turbine 16 results in abstraction of energy by the turbine 16, an attendant drop in pressure across the turbine 16 and, consequently, a drop in temperature of the air passing to the conduit 17. The heat energy thus abstracted, converted into mechanical energy driving the rotor of the turbine 16, is fed into the shaft 56 and thence into the compressor drive shaft 23. Thus energy is conserved and at the same time provision is made for cooling the air passing to the cabin when necessary.

When the thermostat 82 is calling for cooling, it will move the shutters 75 toward open position so as to provide a flow of coolant air through the heat exchanger 15, and will move the valve 77 toward a position wherein the combustion gases flowing through the conduit 62 are diverted to atmosphere through the outlet 76 and the conduit 72 is closed off. By cooling the compressed air flowing in the conduit 14 down to substantially atmospheric temperature in the heat exchanger 15, and then passing it through the turbine 16, wherein a further drop in temperature occurs, it is possible to reduce cabin temperature below ambient atmospheric temperature. At other times the turbine 16 may function simply to remove excess heat from the air which has passed through the heat exchanger 15.

When the thermostat 82 is calling for heat, the shutters 75 will be moved toward closed position to render ineffective the flow of cooling air through the duct 73 and the valve 77 will be moved toward the position wherein the combustion gases are diverted through the conduit 72 into the duct 73 so as to raise the temperature of the fluid flowing therein to a sufficiently high level to achieve a heating effect in the passage through the heat exchanger 15. The degree of heating thus obtained will depend upon the proportioning between the heated combustion gases coming from the conduit 72 and the fresh air coming from the ram inlet 74. At maximum heating the shutters 75 will of course be fully closed and the outlet 76 fully shut off so as to divert the entire heating effect of the combustion gases to the heat exchanger 15 and eliminate completely the cooling flow of atmospheric air.

When cooling is desired while the plane is grounded, a flow of air through the duct 73 may be induced by a blower 83 driven by an electric motor 84 which may be controlled manually by a switch 85 through an electric circuit 86.

The input flow to the compressor 21 must equal the flow through the hot gas turbine 51 plus the leakage flow through the outlet 11. On the other hand, the flow through the secondary compressor 13 must equal the flow through the hot gas turbine 51 plus the flow to the cabin through the conduit 14.

The considerable pressure differential existing between the air flowing in the conduit 14 and the exhaust gases when they reach the heat exchanger 15, is such that there is no likelihood of contamination of the air being delivered to the cabin by any leakage which might occur in the heat exchanger 15.

When operating under cooling cycle conditions without pressurization, the primary compressor 21 will be operative only to supply the amount of fresh air required to replace the leakage from the cabin and the air for the combustion chamber 51. The compressor 13 will at all times, however, act as a means for circulating and recirculating air through the cabin. The amount of air diverted from the conduit 14 to the combustion chamber 57 through the conduit 60 will depend upon operating conditions, but once determined for a particular system, the variation will be so slight that for all practical purposes it may be disregarded.

My improved system does not contain any pressure regulating valves, and depends solely upon regulation of the primary compressor 21 for controlling pressure, under pressurization conditions.

The invention contemplates, as a substitution for the variable slip coupling 24, a throttle on the compressor 21 which is controlled in accordance with cabin pressure requirements.

A starter 87 is connected to the shaft 23 for starting the system. A governor 88 is also connected to the shaft 23, for limiting the speed of operation of the compressors.

I claim as my invention:

1. A system for circulating a fluid under pressure through an enclosure from which a portion of the fluid is allowed to continuously escape, comprising: a primary compressor receiving atmospheric air at its inlet; a second stage compressor; means defining a passage for the delivery of compressed air from said second stage compressor into the enclosure; means defining a return passage for the flow of air from the enclosure to the inlet of said second stage compressor; means for delivering the output of said primary compressor into said return flow passage; means for driving said compressors; and means, responsive to enclosure pressure requirements, for varying the output of said primary compressor whereby to vary and control enclosure pressure.

2. An enclosure pressurizing system comprising, in combination with the enclosure: a primary compressor adapted to receive fresh air; a secondary compressor; means forming a passage for the flow of compressed air from said secondary compressor to the enclosure; means forming a return passage for the flow of outlet air from the enclosure to the inlet of said secondary compressor; means for delivering the output of said primary compressor into said return flow passage for mixing the fresh air with the recirculated air and for determining the pressure in said return flow passage and thus the pressure in the enclosure; and means for varying the output of said primary compressor in response to changes in pressurization requirements in the enclosure, whereby to control enclosure pressure in accordance with said requirements.

3. A system for circulating a fluid under pressure through an enclosure, comprising: means defining a passage for conveying an outflow from the enclosure through a recirculatory path and returning it to the enclosure; a compressor disposed in said recirculatory path and adapted to deliver its output under pressure into the enclosure through said passage; another compressor arranged to deliver its output to the inlet side of said first mentioned compressor and to determine the pressure on said inlet side and thereby determine the pressure in the enclosure; and means for varying the output of said second mentioned compressor in accordance with pressurization requirements in said enclosure.

4. An enclosure pressurization and temperature control system comprising, in combination with the enclosure; means defining a recirculatory path for the outflow of a portion of air from the enclosure and for the return of said portion to the enclosure; a second stage compressor disposed in said circulatory path, receiving the outflow and discharging under pressure to the enclosure; a primary compressor receiving fresh air and discharging into said recirculatory path between the enclosure outlet and the inlet of said second stage compressor whereby to replenish the air in the enclosure and determine enclosure pressure; means for driving said compressors, said last means including a combustion engine and a drive transmission; means for varying the output of said primary compressor so as to control enclosure pressure, said last means comprising a variable drive connection between said drive transmission and said primary compressor and means responsive to enclosure pressure requirements for controlling said variable drive connection; and a heat exchanger utilizing spent combustion gases exhausted from said combustion engine for heating the air in said recirculatory path.

5. A system as defined in claim 4, including means, responsive to the rate of flow in said recirculatory path between the discharge of said second stage compressor and the enclosure, for controlling the fuel input to said combustion engine.

6. A system for circulating air through an enclosure and controlling the temperature thereof, comprising: means defining a recirculatory path for the outflow of a portion of air from said enclosure and return thereof to the enclosure; a pump in said recirculatory path for circulating the air therethrough; a combustion engine for driving said pump; an air conditioning heat exchanger in said recirculatory path; means for delivering the spent combustion gases from said combustion engine to said heat exchanger; means for diverting a portion of air from said recirculatory path to said combustion engine for supporting combustion therein; and a heat exchanger for heating said diverted air, the means for carrying away from said combustion engine the spent combustion gases being arranged to pass said gases through said last mentioned heat exchanger before delivering them to said air conditioning heat exchanger.

7. A system for circulating air through an enclosure and for conditioning the temperature thereof, comprising: means defining a path for delivery of air into said enclosure; means for circulating the air under pressure in said path; an air conditioning heat exchanger disposed in said path; an inlet duct for delivering coolant air to said heat exchanger; cooling means for the air which is moving through said path toward said said enclosure comprising a turbine in said path downstream from said heat exchanger adapted to abstract heat energy from the air flowing therethrough; means for delivering the energy output of said turbine to said circulating means for driving the same; a combustion engine also in driving relation to said circulating means, said engine having a fuel regulator; means for controlling said regulator with relation to changes in the flow of air in said path so as to maintain a predetermined condition therein; means for conveying the spent combustion gases from said engine to atmosphere and to said inlet duct; and means for controlling the diversion of said spent gases to atmosphere or to said inlet duct and to simultaneously control the admission of coolant air into said inlet duct in accordance with the heating and cooling requirements of said enclosure.

8. An enclosure pressurizing and temperature control system comprising, in combination with an enclosure; means defining a recirculatory path for the outflow of a portion of air from said enclosure and for returning such air to the enclosure; a second stage compressor in said recirculatory path receiving the air from the enclosure outlet, compressing it and returning it to the enclosure; a primary compressor receiving fresh air to replace the air that escapes from the enclosure and discharging it into said recirculatory path between the enclosure outlet and the inlet of said second stage compressor; a combustion engine; a drive transmission between said combustion engine and said primary compressor; means responsive to change in enclosure pressure for controlling said drive transmission so as to vary the driving of said primary compressor in accordance with enclosure pressure requirements; a heat exchanger in said path; a turbine receiving from the heat exchanger the air flowing therethrough in said path, said turbine being adapted to abstract heat energy from said air and thereby cool it for delivery into the enclosure; means for conveying spent combustion gases from said combustion engine to atmosphere and to the inlet of said heat exchanger; means for admitting cooling air to said heat exchanger inlet; and means for controlling the diversion of said combustion gases to atmosphere or to said inlet and for controlling the admission of coolant air to said inlet in accordance with enclosure heating and cooling requirements.

9. An enclosure pressurizing and temperature control system comprising, in combination with the enclosure; means defining a path for the delivery of air under pressure into the enclosure; means for compressing the air and delivering it into said path; a combustion engine for driving said compressing means; means responsive to the rate of flow through said path for controlling the supply of fuel to said combustion engine; supplementary air pumping means adapted to deliver air under pressure to the inlet of said compressor; and means responsive to enclosure pressure for controlling said supplementary air pumping means so that it will deliver air at a rate varying in accordance with the pressure requirements of said cabin.

10. A compartment air control system of the character described, comprising: walls forming a path for the circulation of air, said path including said compartment; air pumping means for circulating the air through said path; air cooling means in said path; a combustion motor receiving air from said path; a second air pumping means operating to deliver air from the exterior into said path of flow; control means operative to control the action of said second air pumping means, whereby it will feed into said path of flow an amount of air which will maintain pressure in said compartment and supply the air needs of said combustion motor; drive transmission means connecting said motor with at least one of said air pumping means; and means for utilizing exhaust gases from said combustion motor to heat air in said path of flow.

11. A compartment air control system of the character described, comprising: walls forming a path for the circulation of air, said path including said compartment; air pumping means for circulating the air through said path; air cooling means in said path; a combustion motor receiving air from said path; means responsive to air flow in said path between said combustion motor and said compartment to control the speed of said motor; a second air pumping means operating to deliver air from the exterior into said path of flow; control means operative to control the action of said second air pumping means whereby it will feed into said path of flow an amount of air which will maintain pressure in said compartment and supply the air needs of said combustion motor; and drive transmission means connecting said motor with at least one of said air pumping means.

12. A compartment air control system of the character described, comprising: walls forming a path for the circulation of air, said path including said compartment; air pumping means for circulating the air through said path; air cooling means in said path; a combustion motor receiving air from said path; a second air pumping means operating to deliver air from the exterior into said path of flow; means responsive to changes in the pressure of air in said compartment operative to control the action of said second air pumping means, whereby it will feed into said path of flow an amount of air which will maintain pressure in said compartment and supply the air needs of said combustion motor; and drive transmission means connecting said motor with at least one of said air pumping means.

13. A compartment air control system of the character described, comprising: walls forming a path for the circulation of air, said path including said compartment; air pumping means for circulating the air through said path; air cooling means in said path; a combustion motor receiving air from said path; means responsive to air flow in said path between said combustion motor and said compartment to control the speed of said motor; a second air pumping means operating to deliver air from the exterior into said path of flow; means responsive to changes in the pressure of air in said compartment operative to control the action of said second air pumping means whereby it will feed into said path of flow an amount of air which will maintain pressure in said compartment and supply the air needs of said combustion motor; and drive transmission means connecting said motor with at least one of said air pumping means.

14. A compartment air control system of the character described, comprising: walls forming a path for the circulation of air, said path including said compartment; air pumping means for circulating the air through said path; air cooling means in said path; a combustion motor receiving air from said path; a second air pumping means operating to deliver air from the exterior into said path of flow; and means responsive to changes in the pressure of air in said compartment operative to control the action of said second air pumping means whereby it will feed into said path of flow an amount of air which will maintain pressure in said compartment and supply the air needs of said combustion motor.

15. A compartment air control system of the character described, comprising: walls forming a path for the circulation of air, said path including said compartment; air pumping means for circulating the air through said path; air cooling means in said path; a combustion motor receiving air from said path; a second air pumping means operating to deliver air from the exterior into said path of flow; and control means operative to control the action of said second air pumping means, whereby it will feed into said path of flow an amount of air which will maintain pressure in said compartment and supply the air needs of said combustion motor.

16. A compartment air control system of the character described, comprising: walls forming a path for the circulation of air, said path including said compartment; air pumping means for circulating the air through said path; air cooling means in said path; a combustion motor receiving air from said path; a second air pumping means operating to deliver air from the exterior into said path of flow; control means operative to control the action of said second air pumping means whereby it will feed into said path of flow an amount of air which will maintain pressure in said compartment and supply the air needs of said combustion motor; drive transmission means connecting said motor with at least one of said air pumping means; an expansion air cooling turbine in said path of flow downstream from said air cooling means; and drive transmission means utilizing the power recovered by said cooling turbine in the driving of at least one of said air pumping means.

17. A compartment air control system of the character described, comprising: walls forming a path for the circulation of air, said path including said compartment; air pumping means for circulating the air through said path; air cooling means in said path; a combustion motor receiving air from said path; a second air pumping means operating to deliver air from the exterior into said path of flow to maintain air pressure in said compartment and supply the air needs of said combustion motor; and drive transmission means connecting said motor to at least one of said pumping means so as to furnish power utilized in driving the same.

18. A compartment air control system of the character described, comprising: walls forming a path for the circulation of air, said path including said compartment; air pumping means for circulating the air through said path; air cooling means in said path; a combustion motor receiving air from said path; and a second air pumping means operating to deliver air from the exterior into said path of flow to maintain air pressure in said compartment and supply the air needs of said combustion motor.

19. A compartment air control system of the character described, comprising; duct means forming a path of flow of air having its inlet end and its outlet end connected to said compartment; pumping means for circulating air from said compartment through said path of flow and back again to said compartment; a second pumping means for adding air to said system for maintaining a pressure in said compartment; an air cooling expansion turbine in said path of flow between said first named pumping means and said compartment; and transmission means utilizing power recovered by said turbine for furnishing driving power to at least one of said pumping means.

20. A compartment air control system of the character described, comprising: duct means forming a path of flow of air having its inlet end and its outlet end connected to said compartment; pumping means for circulating air from said compartment through said path of flow and back again to said compartment; a second pumping means for adding air to said system for maintaining a pressure in said compartment; and means responsive to pressure in said compartment for controlling said second air pumping means.

HOMER J. WOOD.

REFERENCES CITED

The following references are of record in the file of this patent:

UNITED STATES PATENTS

| Number | Name | Date |
|---|---|---|
| 2,119,402 | Puffer | May 31, 1938 |
| 2,297,495 | Pfau | Sept. 29, 1942 |
| 2,391,838 | Kleinhans et al. | Dec. 25, 1945 |